(No Model.)
J. E. WIGGIN.
MACHINE FOR PRICKING THE SOLES OF BOOTS AND SHOES.
No. 249,713. Patented Nov. 15, 1881.
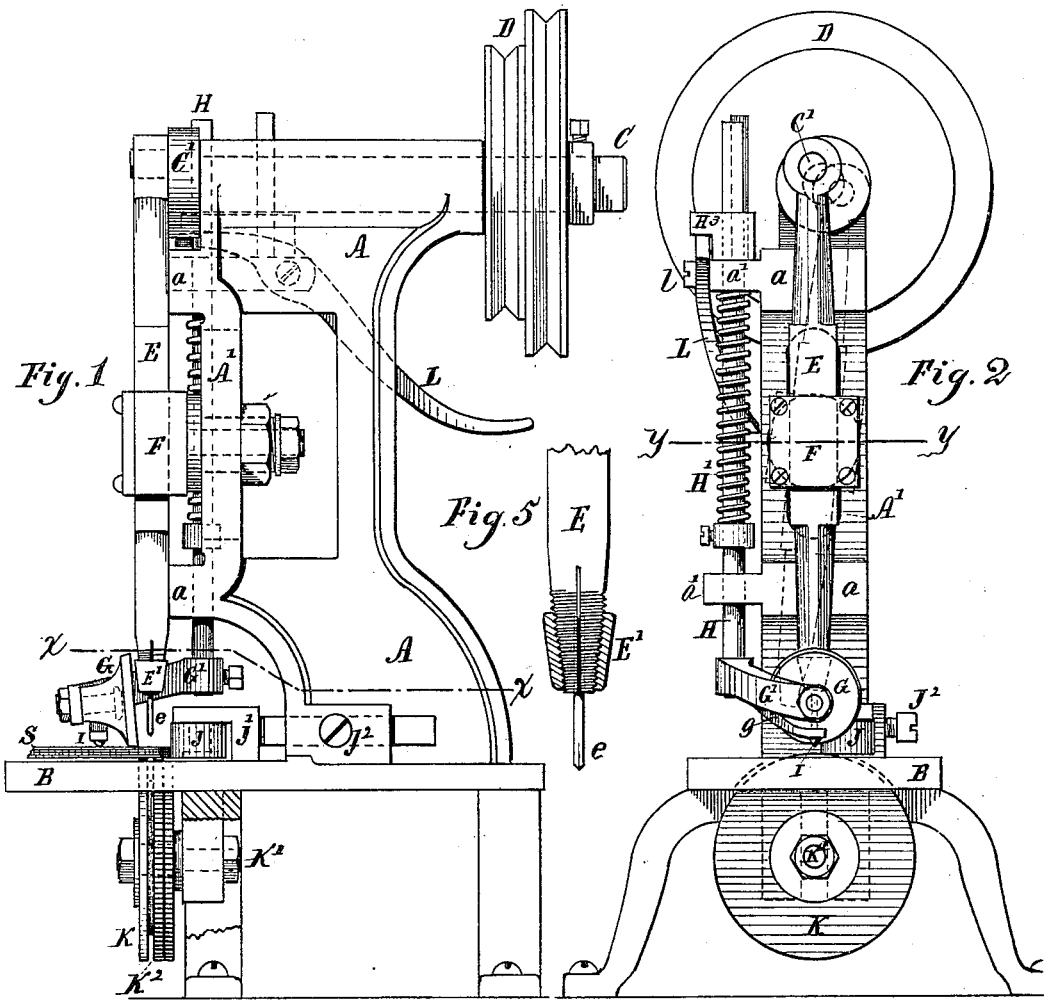
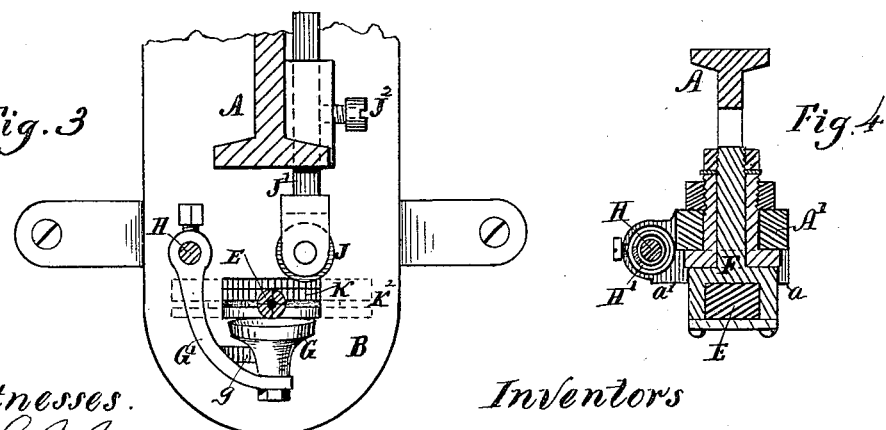
Witnesses.
S. R. Bartou
Geo. M. Rice 2d
Inventors
John E. Wiggin
By Chas. H. Burleigh
Atty.

UNITED STATES PATENT OFFICE.

JOHN E. WIGGIN, OF STONEHAM, ASSIGNOR TO SAMUEL MAWHINNEY, OF WORCESTER, MASSACHUSETTS.

MACHINE FOR PRICKING THE SOLES OF BOOTS AND SHOES.

SPECIFICATION forming part of Letters Patent No. 249,713, dated November 15, 1881.

Application filed May 19, 1881. (No model.)

*To all whom it may concern:*

Be it known that I, JOHN E. WIGGIN, of Stoneham, in the county of Middlesex and State of Massachusetts, have invented certain new and useful Improvements in Machines for Pricking the Soles of Boots and Shoes; and I declare the following to be a description of my said invention, sufficiently full, clear, and exact to enable others, skilled in the art to which it appertains, to make and use the same, reference being had to the accompanying drawings, which form a part of this specification.

The object of my present invention is to provide a simple, convenient, and practical mechanism for pricking or punching holes in the soles of boots and shoes preparatory to nailing said soles to the boot or shoe; and my invention consists in the mechanism constructed and operating as herein shown and described.

In the drawings, Figure 1 represents a side view of my improved machine for pricking nail-holes in soles. Fig. 2 is a front view of the same. Fig. 3 is a horizontal sectional view at line $x$ $x$, Fig. 1. Fig. 4 is a horizontal section at line $y$ $y$, Fig. 2; and Fig. 5 is a detail view, on larger scale, showing the manner of attaching the awl to the punch-bar.

The reference-letter A denotes the frame, of proper form and size for supporting the operative parts, and provided with suitable feet or stands for securing to the work bench or table, as required.

B denotes the bed-plate for the support of the soles as they are fed into the machine.

C indicates the operating-shaft, mounted at the upper part of the main frame, and provided with a pulley, D, for the driving-belt, and with an eccentric or crank, C', for actuating the punch-bar E, which carries the pricking-awl $e$. The punch-bar E is arranged against bearing-surfaces $a$ $a$ on the front of the frame A, its central part being retained by the fulcrum-bearing F, and its upper end, which is provided with a suitable opening, connected to the crank C', as indicated, so that the revolving motion of the shaft C will impart to said bar E an up-and-down movement, and also a backward-and-forward swinging or oscillative action. The fulcrum-bearing F permits the bar E to slide up and down freely through it, while retaining it from lateral movement, except as it oscillates on the fulcrum-axis. Said fulcrum-bearing is secured in a slot formed in the part A' of the frame A, so that it can be adjusted up and down to vary the swinging action of the punch-bar E and give longer or shorter throw to its lower or awl end, thereby changing the distance at which the holes are spaced in the soles. The lower end of the bar E is made, as shown in Fig. 5, with a split and tapered screw, and the awl $e$ is held by being clamped therein by screwing on the conical nut E', in the manner similar to an ordinary awl-haft.

G indicates the presser foot or wheel for holding down the soles upon the bed. Said wheel is connected by arm G' to the vertical bar H, which is arranged through bearings $a'$ $a'$ and provided with a pressure-spring, H', as illustrated. The face of the wheel G may be beveled and its axis set in an inclined position, so that the upper part of said wheel will clear the punch-bar E, while its lower part will bear upon the sole near the working-line of the awl $e$.

I indicates a point or stud on a small auxiliary arm, $g$, connected with the presser-arm G', which stud I runs on the surface of the sole and assists in guiding it through the machine.

J indicates a roll or edge guide for adjusting the distance from the edge at which the nail-holes are pricked in the soles. Said roll is journaled on the adjusting-bar J', which slides in a boss on the frame A, and is retained by a set-screw, J², at any desired position.

K indicates the bed-wheel, which supports the sole against the action of the awl $e$. Said wheel is mounted on a stud, K', at the lower part of the frame, and projects up through a suitable opening in the table B, as indicated. The stud K' is adjustable for regulating the height of the wheel K, as required. A deep groove, K², is formed around the wheel K, into which the awl $e$ enters as it is forced through the sole. One part of the wheel-surface may be notched or corrugated, so that it will adhere to the surface of the leather sufficiently to prevent slipping thereon.

L indicates a lever for raising the presser foot or roll G. Said lever is fulcrumed on the frame at $l$, and acts beneath the lug or collar H³ for elevating the bar H in opposition to the spring H'. Said lever may, if preferred, be located in other position from that herein shown.

The center of the crank-shaft C is placed slightly to the front of a vertical plane, passing through the axis of the fulcrum-bearing F, so that the downward stroke of the punch-bar E will be made more directly vertical than it would be if the centers of the shaft and fulcrum were both in the same vertical plane.

In the operation of my improved pricking-machine the sole S is placed beneath the wheel G, with its edge against the roll J, the downward movement of the bar E forces the awl e through the leather, the swing action of said bar feeds forward the sole S, the upward movement withdraws the awl, and the opposite swing of the bar carries the awl to position for the next hole.

The shaft C may be speeded some five hundred revolutions, more or less, per minute, so that the soles can be pricked, ready to receive the attaching-nails, in a very easy, rapid, and satisfactory manner.

The machine is inexpensive and simple and can be attended by any ordinary boy or girl, such as are employed in boot or shoe factories.

What I claim as of my invention, and desire to secure by Letters Patent, is—

1. The centrally-fulcrumed punch-bar E, provided with a split screw and nut, E', for holding an awl, the operating-shaft C, having crank C' connected with said bar, and the bed-wheel K, provided with the groove K², in combination as and for the purpose hereinbefore set forth.

2. In combination, as described, the reciprocating and swinging punch-bar E, carrying the awl e, the yielding presser devices G H, the adjustable edge-guide J, the table B, and the grooved bed-wheel K, for the purposes set forth.

3. The frame A, with slotted bar A' and bearing-surfaces a a, the oscillating fulcrum-bearing F, adjustably attached to said frame-bar, the crank-shaft C, mounted at the top of said frame, the punch-bar E, carrying the awl e, operated by said crank-shaft and guided by said fulcrum and bearing-surfaces, the presser-rod H, with spring H' and foot-wheel G, the adjustable edge-guide J, and grooved bed-wheel K, combined and organized for operation as and for the purpose set forth.

4. The combination, with the pricking-awl e, the bed-wheel K, and edge-guide J, of a presser having the beveled-faced wheel and stud I, arranged for operation as shown and described.

Witness my hand this 11th day of May, A. D. 1881.

JOHN E. WIGGIN.

Witnesses:
OMLON GILMORE,
THOMAS H. JONES.